Sept. 13, 1966 R. E. MOTTIN 3,272,308
MECHANICAL LOADER AND CONVEYOR MECHANISM FOR HANDLING
RELATIVELY SMALL AND BREAKABLE ARTICLES
Original Filed Dec. 3, 1959 3 Sheets-Sheet 1
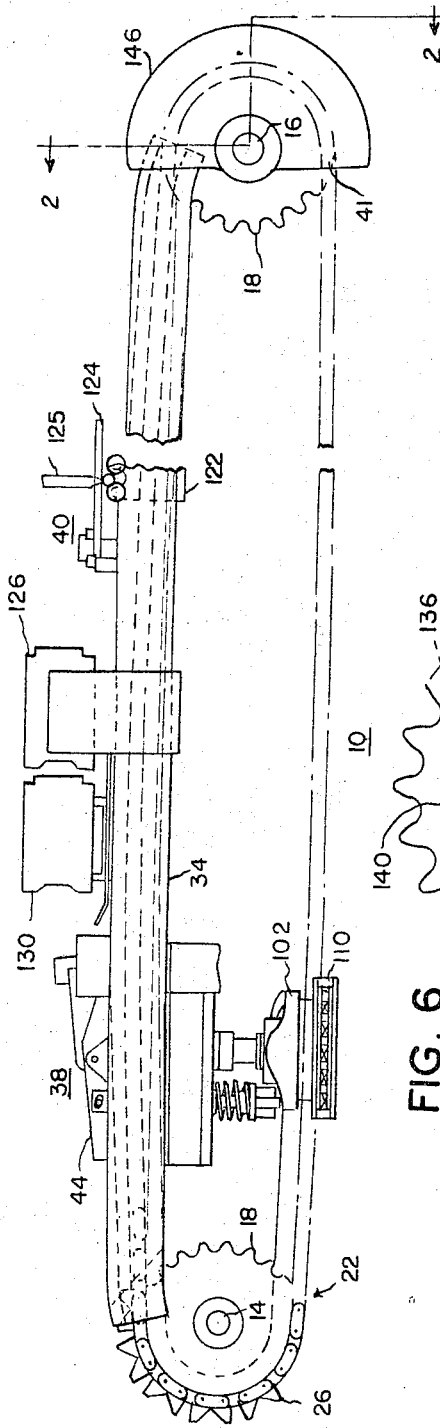
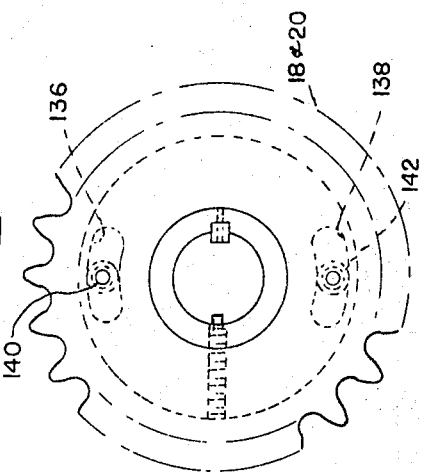
INVENTOR.
RALPH E. MOTTIN
BY
*Barnes, Kisselle, Raisch & Choate*
ATTORNEYS Sept. 13, 1966  R. E. MOTTIN  3,272,308
MECHANICAL LOADER AND CONVEYOR MECHANISM FOR HANDLING
RELATIVELY SMALL AND BREAKABLE ARTICLES
Original Filed Dec. 3, 1959  3 Sheets-Sheet 2

INVENTOR.
RALPH E. MOTTIN
BY
Barnes, Kisselle, Raisch & Choate
ATTORNEYS

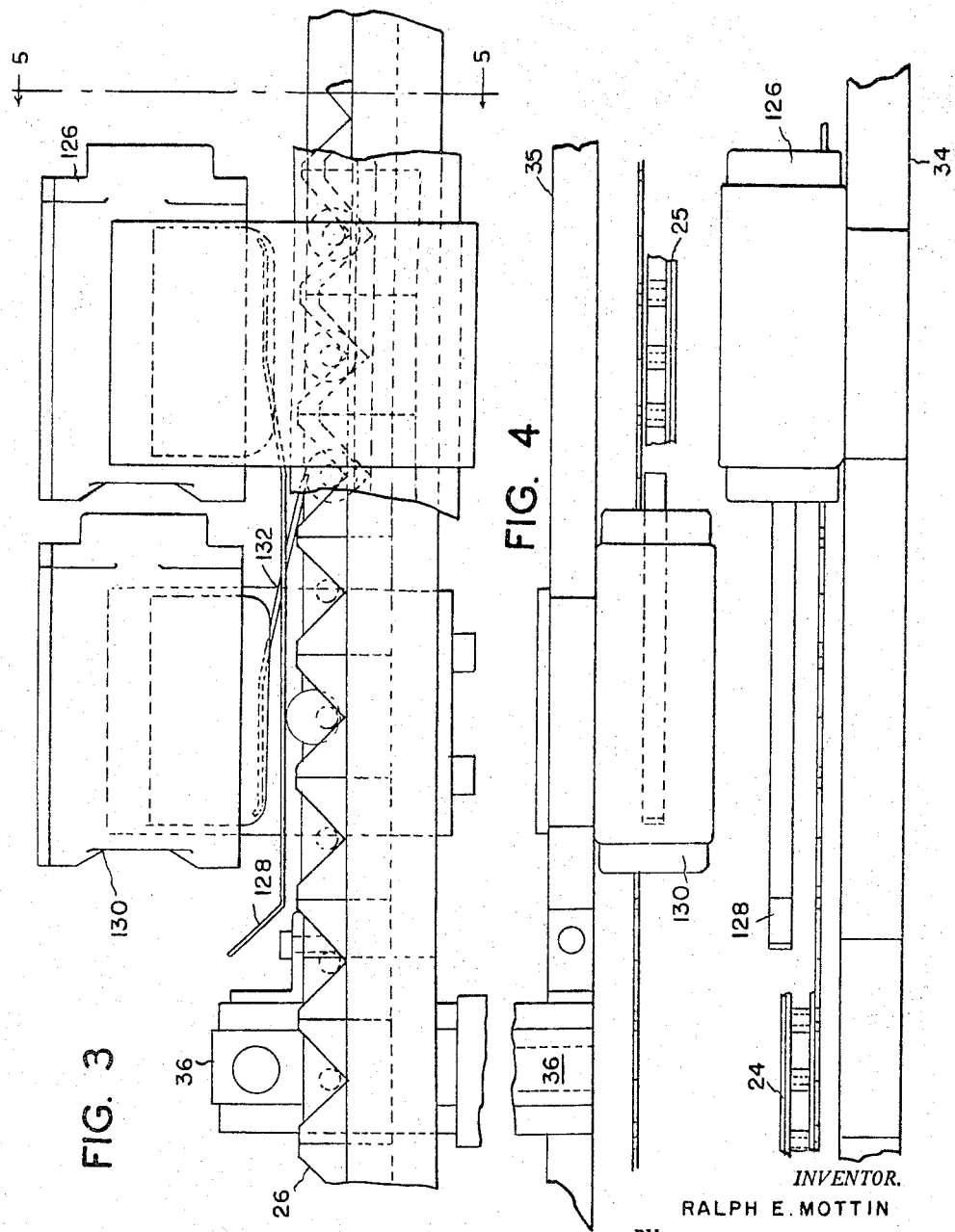

United States Patent Office
3,272,308
Patented Sept. 13, 1966

3,272,308
MECHANICAL LOADER AND CONVEYOR MECHANISM FOR HANDLING RELATIVELY SMALL AND BREAKABLE ARTICLES
Ralph E. Mottin, Grosse Pointe Park, Mich., assignor to Parke, Davis & Company, Detroit, Mich., a corporation of Michigan
Continuation of application Ser. No. 271,535, Feb. 12, 1963, which is a division of application Ser. No. 857,150, Dec. 3, 1959. This application Apr. 19, 1965, Ser. No. 449,205
4 Claims. (Cl. 198—19)

This application is a continuation of my copending application Serial No. 271,535, filed February 12, 1963, now abandoned, which is a division of my parent application Serial No. 857,150, filed December 3, 1959, now United States Patent No. 3,087,595.

This invention relates to a conveying system for moving relatively small articles from a feeder mechanism or loading station to a selected operational position at another station. More particularly, this invention relates to a loader mechanism wherein relatively small articles are taken from a loading station and are distributed to a receiving station. This is accomplished by utilizing vertically moving fingers which receive the individual articles from the feeder mechansm and deposit them one by one onto a moving endless conveyor. The loading device or mechanism operates automatically to receive and transfer a supply of relatively small articles from a feeder mechanism, which carries the articles in an end-to-end position, to an independent transfer mechanism which carries the articles in a side-by-side position without jamming, piling, breaking, spilling, or otherwise injuring or marking any of the articles.

As an example, the articles may be ampoules, bottles, metal parts, glass or plastic envelopes, electronic tubes, electric light bulbs or similar small articles. This invention will be discussed in its application to automatically transferring ampoules utilized in the pharmaceutical industry, although it should be understood that the invention is readily applicable for handling similar small articles.

The ampoules under consideration are unfilled and unmarked although it should be understood that filled ampoules may also be utilized. The empty ampoules are taken from the loading mechanism by the endless conveyor to another station, as an example, to a printing station where each ampoule is raised for a brief period from the conveyor on a four-wheel support to a fixed predetermined position to permit rotatable contact with the printer mechanism which has a laterally moving printing screen. When in this position the ampoule rotates about its longitudinal axis receiving a printed impression of ceramic base ink after which the ampoule is lowered back onto the conveyor and carried to a discharge station. The ampoule is discharged from the endless conveyor to another conveyor which passes through a lehr in which the heat fuses the ceramic base ink impression permanently to the ampoule. "Ground-glass" ink is one example of a ceramic base ink.

The term "label" or "print" is used throughout the specification to include printing, marking, impressing, or otherwise affixing any kind or type of a designation to an ampoule or similar article.

The above-described operation, and particularly the loading mechanism associated therewith, is operated automatically and usually requires no special attention except for occasional maintenance purposes.

It is, therefore, an object of the present invention to provide an automatic loader mechanism for transferring relatively small articles from a feeder mechanism, which has the articles in an end-to-end position, to an independent transfer mechanism which carries the articles in a side-by-side position without jamming, piling, breaking, or otherwise injuring or marking any of the articles.

A further object of the invention is to provide an endless chain conveyor having side guide rails which may be adjusted to suit different size articles.

A still further object of the invention is to provide a conveyor mechanism having automatic switch means associated therewith for terminating the flow of articles thereto when one of the articles on the conveyor mechanism is not properly oriented or when a similar emergency situation has occurred.

Another object of the invention is to provide a conveyor mechanism utilizing automatic switch means for stopping the printing apparatus when a series of articles are missing from the conveyor mechanism.

Still another object of the invention is to provide an improved chain conveyor mechanism utilizing curved tracks so that the chains are always pushing down on the tracks.

A further object of the invention is to provide an improved chain conveyor mechanism utilizing a pair of adjustable curved tracks, each track having a chain that is continuously pushing down on the track, said mechanism being designed so that the articles moving therethrough are held in three directions to prevent shifting of the articles with respect to the chains.

A still further object of the invention is to provide a conveyor mechanism having a pair of chain and curved track assemblies and a hub discharge mechanism on one end of the assembly which utilizes retainer means for holding the articles as they move around the hub through approximately 180° to a discharge station without sliding, dropping, or smearing any of the articles.

Another object of the invention is to provide an automatic loader and a conveyor mechanism which lend themselves admirably to applications for handling relatively small articles and where reliability in operation, economical and simplicity of construction and minimum of maintenance are essential.

FIGURE 1 is a side elevation of the conveying mechanism.

FIGURE 3 is a side elevation of the safety switch mechanism associated with the conveyor.

FIGURE 4 is a top view of the mechanism shown in FIGURE 3.

FIGURc 6 is a view of the sprocket face.

FIGURE 1 shows an elevational view of a conveyor system designated by the numeral 10. The conveyor system 10 is supported by an appropriate structural steel frame, not shown, which raises the conveyor 10 to a suitable distance off the ground so as to interconnect its operation with a feeding conveyor, not shown, which operates perpendicularly to the conveyor 10.

Figure 2:
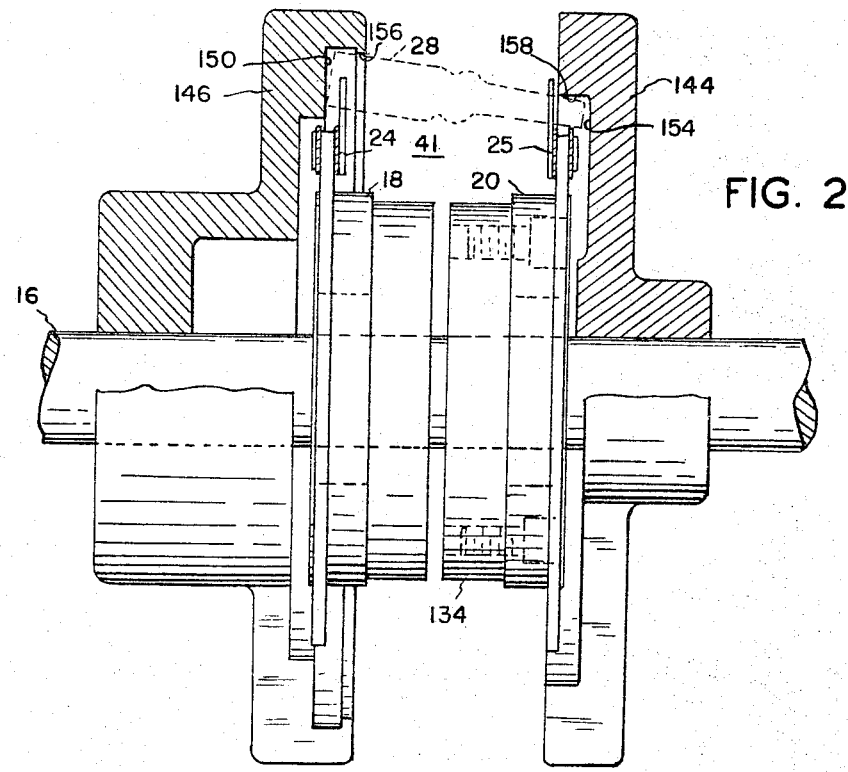
FIGURE 2 is a view taken on the line 2—2 of FIGURE 1 showing partly in section the contour of the sprockets, chains, and associated hub mechanism.

The shafts 14 and 16 located at opposite ends of the conveyor 10 each carry a pair of sprockets 18 and 20 as is best shown in FIGURE 2. The shafts are mounted on the frame of the conveyor 10. A conveyor 22 is driven by the sprockets through conventional chain driving mechanism not shown. The conveyor 22 is usually of the endless type and is composed of a pair of chains 24 and 25 which are mounted around the sprockets. The load carrying portions of the chains are supported by curved tracks as will be subsequently described. Chains 24 and 25 consist of a plurality of links 26 for transferring the ampoules 28 from a loading station to a printing station and then to a discharge station.

It will be observed that the ampoule 28 is cylindrical in cross section throughout, having a large end 29 and a small end 29a. It is important that the ampoule 28 be carried from the loading device to the printing station in a horizontal position in order that the print is properly applied to the ampoule.

A pair of conveyor guide rails or tracks 30 and 32 are provided with a longitudinaly extending opening 31 and 33 respectively. The tracks 30 and 32 are curved from the center line of shaft 14 to the center line of shaft 16 with the highest point or crown of the tracks being under the printing station as will be subsequently described. The crowned or curved tracks 30 and 32 may be considered as a section of a large drum with the chains 24 and 25 located in the track openings so as to continuously push down against the tracks. Such a construction has effectively eliminated extra chain movement or "rippling" which occurs when a chain is used on a flat track or rail.

Rail 32 is mounted at a higher elevation than rail 30 so as to raise the chain 24, which runs longitudinally in in the groove 33, to compensate for the difference in radius between tthe large and small ends of the ampoule 28 and thereby maintain the ampoule in a horizontal position. On the outer sides of the rails 30 and 32 are located guide members 34 and 35 which are spaced parallel to each other at a distance slightly in excess of the width of the ampoule. The guide members 34 and 35 are notched so as to partly engage the top and outer sides of the rails 30 and 32. It should be observed by referring to FIGURE 5 that the top surfaces 37 and 39 of guide members 34 and 35 respectively are at the same elevation. This is due to the difference in height of members 34 and 35.

The track and guide rail assemblies are shaped and designed to retain the chains in three directions. The guide rails prevent the ampoules from shifting with respect to the chains and insure that the ampoules register with the printing station with the same degree of accuracy in order that the printing will start at a fixed distance from the end of each ampoule.

The conveyor system 10 may be divided into the following sections for discussion purposes only: feeder section 36, which forms no part of the present invention; receiving and loading station 38; printing station 40; and a discharge section 41.

The ampoules 28, as mentioned before, are transferred from the feeder section 36 to the loading station 38 by a belt conveyor or other means not shown, which moves substantially perpendicular to the conveyor 10 and which carries the ampoules 28 in an end-to-end position. In other words, the large end 29 of tthe lagging ampoule follows the small end 29a of the leading ampoule. The feeder section 36 includes a pneumatic ejection nozzle or orifice 42, as is disclosed and described as part of my copending application, "Automatic Feeder Mechanism for Orienting Relatively Small Articles," filed November 16, 1959, Serial No. 853,354, now my United States Patent No. 3,106,281.

The ampoules are ejected by air to readily move the ampoules one by one from the end of the feeding section 36 into the loading mechanism 38 in timed sequence so as to prevent unnecessary delay and to further prevent breaking, jamming, or otherwise injuring the ampoules 28.

FIGURE 1 shows a loading mechanism 44 which is included as part of the loading station 38. The mechanism 44 consists, in essence, of a pair of movable fingers which are moved in timed relationship with the chain conveyor 22 and which define an ampoule holding device which takes an individual ampoule as it is ejected from the feeder mechanism 36 and places the ampoule 28 in the links 26 of the conveyor 22. Mechanism 44 is disclosed in detail and claimed in my copending application Serial No. 857,150, filed December 3, 1959, now United States Patent No. 3,087,595, the instant application being a continuation of a divisional application thereof.

Figure 5:
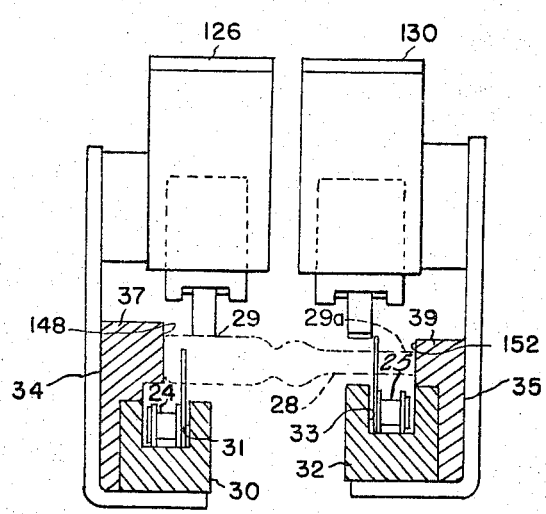
FIGURE 5 is a partial sectional view taken on line 5—5 of FIGURE 3.

FIGURE 5 shows that chain 25 is at a higher elevation than chain 24. This difference in elevation is maintained as the ampoules progress to the printing station 40 shown in FIGURE 1. Both guide rails and guide members are sufficiently crowned, as has been previously explained, so that the highest point of the crown is under the printing station 40. The "crowning" effect has been exaggerated in FIGURE 1 for purposes of emphasis. Prior to the ampoules reaching the printing station 40, a pair of safety switches are provided as shown in FIGURES 3 and 4. The switch 126, which is connected to the printer 40, is mounted on the guide member 30 and has a leaf 128 which extends into the flow path of the ampoules as is best illustrated in FIGURE 3. The switch 126 is actuated to close or shut the printer 40 when a series of four ampoules are missing from the conveyor 10. This prevents an excessive amount of ink from being fed to the printing screen. The switch 126 serves as a detector and is actuated when a predetermined number of ampoules are missing from the line of flow. The number of missing ampoules utilized to actuate the switch 126 is determined by trial and error and is based on the printer capacity to hold ink and still not effect the quality of the printing. An excessive amount of ink at the printer would cause the lagging ampoules to smear.

Another switch 130 is mounted on the guide member 35 and provides means for terminating the flow of ampoules 28 from the feeder system when a non-oriented ampoule has been detected by the actuating arm 132. Serious damage would result to the printing station 40 if the non-oriented ampoules were not detected.

After the ampoules 28 are placed on the conveyor links 26, they are moved along to the printing station 40, as is schematically shown in FIGURE 1. A wheeled support 122 raises the ampoule 28 from the links for a brief period to a fixed predetermined position to permit rotatable contact with a laterally moving silk screen printing plate 124. A squeegee 125 is mounted directly above the label which is impressed into the silk screen. The ceramic base ink is fed to the screen so that as the ampoule rotates about its longitudinal axis, ink is transferred to the ampoule. After the ampoule has had the label printed or screened thereon, it is lowered onto the links and moved therefrom to a discharge station where the ampoule is discharged therefrom to a separate conveyor which passes through an annealing oven in which the heat fuses the ink impression permanently to the ampoule. The oven is driven by the same drive mechanism uitlized on the conveyor and loader.

After the ampoule has had the label impressed thereon, it is necessary for the continuous conveyor 22, as it advances to the point of discharge, to pass over and around the sprockets 18 and 20, at the discharge end of the conveyor.

As mentioned previously, the highest point of the "crowned" rails is immediately below the printing plate 124. The rails and chains are then gradually brought to the same elevation as is shown in FIGURE 2 so that the chains may move readily around the sprockets 18 and 20. This results in the tilting of the ampoules as they pass around the discharge hub mechanism.

FIGURE 2 shows the rotatable shaft 16 having mounted thereon a pair of rings 134 which are keyed to the shaft. Sprockets 18 and 20 are angularly adjustable on the rings 134. The sprockets 18 and 20 have slots 136 and 138 provided therein, as shown in FIGURE 6, which receive bolts 140 and 142 respectively so as to provide angularly adjustable means between the rings and sprockets. This adjustment feature provides for the obtaining of proper timing between the chains and the loading station.

The inside hub 144 and the outside hub 146 are attached to guide rails 32 and 30 respectively by screws or other fastening means so that the ampoules are physically carried around the hub, through aproximately 180° without sliding, dropping, or smearing any of the ampoules. Face 148 of guide member 34 is in line with face 150 of hub 146 while face 152 of guide member 35 is in line with face 154 of hub 144. Hub 146 through face 150 and shoulder 156 and hub 144 through face 154 and shoulder 158 provide retaining means for holding the ampoule in a predetermined fixed position as it is moved around the end sprockets approximately 180° to a dicharge position. At this position, the ampoules are deposited gently and properly positioned into fusion-like conveyor buckets not shown.

The conveyor 22 may be adjusted to handle ampoules of various sizes. FIGURE 2 shows the hub members spaced ot handle ampoules of aproximately two inches in length. The outer hub members 146, rail 30, and guide member 34 may be adjusted on shafts 14 and 16 for various positions. The guide members 34 and 35 maintain the ampoules in the proper position on the chain conveyor.

Operation

From the above description, the operation of the conveyor-printer is self-explanatory to those skilled in the art. However, the following brief description of the operation of the conveyor mechanism will be of help to those not familiar with the art.

The conveyor-printer functions to move the ampoules 28 from the feeder section 36 to the vertically moving fingers of loading mechanism 44. The conveyor 22 and the loading device 44 are moved in timed relationship.

After the ampoule has been deposited on the links 26, the ampoule is moved to the printing station 40 where each ampoule is raised from the conveyor 22 on a four-wheel support 122 to a fixed predetermined position to permit rotatable contact with the laterally moving silk screen printing plate 124. After the label has been impressed on the ampoule 28, the ampoule is lowered onto the conveyor 22 and carried to the discharge station. The ampoule 28 is discharged therefrom to a separate conveyor, not shown, which passes through an annealing oven in which the ceramic base ink is fused to the ampoule by the heat. The oven, conveyor, and loader are driven in timed relationship.

Electrically operated safety switches 130 and 126 are provided intermediate the loading station 38 and the printing station 40. Switch 126 detects four or more missing ampoules while switch 130 detects non-oriented ampoules.

This invention, including the automatic loader and the conveyor mechanism, has many important features which lend themselves admirably to application for handling relatively small articles. The automatic loader mechanism transfers the small articles from a feeder mechanism, which has the articles in an end-to-end position, to an independent transfer mechanism which carries the articles in a side-by-side position to a printing station without jamming, piling, breaking, or otherwise injuring or marking any of the articles.

The conveyor mechanism utilizes a pair of curved tracks, with each track having a longitudinal groove therein in which is located a chain which moves through the groove and exerts a continuous downward force on the track. This construction has eliminated excessive movement or rippling of the chain. This feature is important when the mechanism is indexed. The shape and contour of the tracks retain the chains in three directions. The guide members hold the ampoules in a side-by-side position on the conveyor links and prevent slippage of the ampoules relative to the chain. This insures that the ampoules are delivered to the printing station in the same position at all times.

The discharge hub mechanism which is attached to the guide rails is so designed as to provide retaining means for carrying the ampoules around the sprockets to the discharge station without dropping or injuring the ampoules.

The drawings and the foregoing specification constitute a description of the improved mechanical loader and conveyor mechanism for handling relatively small and breakable articles in such full, clear, concise and exact terms as to enable any person skilled in the art to practice the invention, the scope of which is indicated by the appended claims.

I claim:
1. In a machine for performing an operation on articles such as ampoules or the like the combination of a conveyor mechanism for transporting the articles in the machine comprising a pair of rotatably mounted sprockets having their axes disposed generally horizontally and spaced apart in generally parallel relation, an endless chain passed around said sprockets, means for intermittently driving the chain around said sprockets such that said chain has an indexing motion whereby the chain is alternately accelerated and decelerated as it is started and stopped by said chain driving means, said chain having means thereon for supporting articles to be transported, at least a portion of the upper run of the chain serving as an article transport portion along which articles are adapted to be carried by the chain, a continuously curved support underlying and contacting the chain throughout the extent of said article transport portion thereof, said support being curved upwardly in an outwardly convex direction relative to an imaginary straight line connecting the axes of the two sprockets so as to maintain said portion of the chain in a taut condition, said continuously curved support having a high point intermediate its ends such that said portion of the chain is elevated in traveling to and from said high point whereby said chain exerts force perpendicularly against the curved support throughout the extent thereof in a downward direction and longitudinally of the path of travel of the chain to thereby minimize the tendency for the chain to ripple or otherwise move out of contact with the curved support upon acceleration and deceleration thereof, and work station means positioned adjacent said high point of said support including movable means in registry with a stopped position of said article support means at said high point and operable in timed relation with the indexing motion thereof to engage an article thereon during the stopped condition of the chain for temporarily supporting the article while an operation is performed thereon by said work station means.

2. The combination as set forth in claim 1 wherein said support comprises a track having a groove therein in which the chain is received.

3. In a printing mechanism for imprinting articles such as ampoules or the like the combination of a conveyor mechanism for transporting the articles comprising a pair of rotatably mounted sprockets having their axes disposed horizontally and spaced apart in generally parallel relation, an endless chain passed around said sprockets, means for intermittently driving the chain around said sprockets such that said chain has an indexing motion whereby the chain is alternately started and stopped, said chain having means on the other side thereof for supporting the articles to be transported, one portion of the upper run of said chain between said sprockets comprising a tensioned run of the chain adapted to serve as an article transport portion along which articles are adapted to be carried on said article support means by the chain, a continuously curved support contacting the under side of the upper run of said chain opposite said outer side thereof throughout the extent of said article transport portion thereof, said support being curved in an outwardly and upwardly convex direction relative to an imaginary straight line connecting the axes of the two sprockets so as to maintain said portion of the chain in a taut condition, said continuously curved support engaging said article transport portion such that the chain exerts force downwardly against the curved support throughout the extent thereof in a direction longitudinally of the path of travel of the chain to thereby minimize the tendency for the chain to ripple or otherwise move out of contact with said curved support upon acceleration and deceleration thereof during said indexing motion, and means for imprinting the articles comprising a printing station positioned at a point along said one portion of said chain and including movable means adjacent said curved support in registry with a stopped position of said article support means and operable in timed relation with the indexing motion thereof to engage an article thereon during the stopped condition of the chain for temporarily supporting the article while it is being imprinted by said printing station means.

4. The prining mechanism as set forth in claim 3 wherin said chain comprises a pair of laterally spaced endless chains passed around said sprockets, said support comprises a pair of tracks, one for each chain, and each track, has a high point intermediate its ends such that said one portion of the chain is elevated in traveling to and from said high point, said printing station means being positioned adjacent said high point of said support with said movable means in registry with a stopped position of said article support means at said high point.

References Cited by the Examiner

UNITED STATES PATENTS

| | | | |
|---|---|---|---|
| 993,313 | 5/1911 | Merz | 198—189 |
| 1,979,799 | 11/1934 | Heineman | 198—173 |
| 2,782,650 | 2/1957 | Fergason | 198—208 |
| 2,856,058 | 10/1958 | Todd et al. | 198—33.4 |

EVON C. BLUNK, *Primary Examiner.*

SAMUEL F. COLEMAN, *Examiner.*

R. WALKER, R. E. AEGERTER, *Assistant Examiners.*

UNITED STATES PATENT OFFICE
CERTIFICATE OF CORRECTION

Patent No. 3,272,308                          September 13, 1966

Ralph E. Mottin

It is hereby certified that error appears in the above numbered patent requiring correction and that the said Letters Patent should read as corrected below.

Column 6, line 56, for "other" read -- outer --.

Signed and sealed this 1st day of August 1967.

(SEAL)
Attest:

Edward M. Fletcher, Jr.
Attesting Officer

EDWARD J. BRENNER
Commissioner of Patents